US012551114B2

(12) United States Patent
Gopinathan et al.

(10) Patent No.: US 12,551,114 B2
(45) Date of Patent: Feb. 17, 2026

(54) SYSTEM FOR DETECTING ABNORMAL BLOOD VOLUME AND PRESSURE

(71) Applicant: Analog Devices, Inc., Wilmington, MA (US)

(72) Inventors: Venugopal Gopinathan, Boston, MA (US); Tony J. Akl, Bedford, MA (US)

(73) Assignee: Analog Devices, Inc., Wilmington, MA (US)

( * ) Notice: Subject to any disclaimer, the term of this patent is extended or adjusted under 35 U.S.C. 154(b) by 714 days.

(21) Appl. No.: 17/723,299

(22) Filed: Apr. 18, 2022

(65) Prior Publication Data

US 2022/0338818 A1    Oct. 27, 2022

Related U.S. Application Data

(60) Provisional application No. 63/177,514, filed on Apr. 21, 2021.

(51) Int. Cl.
*A61B 5/0205*    (2006.01)
*A61B 5/00*    (2006.01)
(Continued)

(52) U.S. Cl.
CPC ........ *A61B 5/0205* (2013.01); *A61B 5/02125* (2013.01); *A61B 5/4052* (2013.01);
(Continued)

(58) Field of Classification Search
CPC ..... A61B 5/0205; A61B 5/681; A61B 5/7278; A61B 5/02416
See application file for complete search history.

(56) References Cited

U.S. PATENT DOCUMENTS 7,544,168 B2    6/2009    Nitzan
7,674,231 B2    3/2010    McCombie et al.
(Continued)

FOREIGN PATENT DOCUMENTS

AU    2014250616 B2    11/2014
CA    3007457    6/2017
(Continued)

OTHER PUBLICATIONS

Thomas et al., *BioWatch: A Non-Invasive Wrist-based Blood Pressure Monitor that Incorporates Training Techniques for Posture and Subject Variability*, IEEE Journal of Biomedical and Health Informatics, 10 pages.
(Continued)

*Primary Examiner* — Carl H Layno
*Assistant Examiner* — Bryan McAllister Lee
(74) *Attorney, Agent, or Firm* — ArentFox Schiff LLP

(57) ABSTRACT

The present disclosure describes a system for detecting abnormal blood pressure or blood volume in a user, the system comprising a processing system; a pulse transit time (PTT) detection system for providing a PTT signal indicative of a PTT of the user to the processing system, wherein PTT of the user is used as a surrogate for a blood pressure (BP) of the user; and an electrodermal activity (EDA) detection system for providing an EDA signal indicative of an EDA of the user to the processing system; wherein the processing system processes the PTT signal and the EDA signal to determine an index indicative of an abnormal blood pressure or blood volume of the user.

21 Claims, 5 Drawing Sheets

(51) Int. Cl.
*A61B 5/021* (2006.01)
*A61B 5/024* (2006.01)
*A61B 5/0531* (2021.01)
*A61B 7/04* (2006.01)

(52) U.S. Cl.
CPC ............ *A61B 5/681* (2013.01); *A61B 5/7278* (2013.01); *A61B 5/02405* (2013.01); *A61B 5/02416* (2013.01); *A61B 5/0531* (2013.01); *A61B 7/04* (2013.01)

(56) References Cited

U.S. PATENT DOCUMENTS

| | | | |
|---|---|---|---|
| 8,086,301 | B2 | 12/2011 | Cho et al. |
| 8,239,010 | B2 | 8/2012 | Banet et al. |
| 8,303,807 | B2* | 11/2012 | Zhang ................. A61M 1/3639 210/90 |
| 8,419,649 | B2 | 4/2013 | Banet et al. |
| 9,189,599 | B2 | 11/2015 | Adler et al. |
| 9,307,915 | B2 | 4/2016 | McCombie et al. |
| 2003/0236451 | A1 | 12/2003 | El-Nokaly et al. |
| 2004/0193068 | A1* | 9/2004 | Burton ...................... A61B 5/16 600/595 |
| 2005/0228297 | A1 | 10/2005 | Banet et al. |
| 2014/0152792 | A1* | 6/2014 | Krueger ............... A61B 5/4863 348/78 |
| 2015/0057512 | A1 | 2/2015 | Kapoor |
| 2015/0287187 | A1 | 10/2015 | Redtel |
| 2018/0368765 | A1* | 12/2018 | Srivastava ........... A61B 5/4884 |
| 2019/0167176 | A1* | 6/2019 | Annoni ................ A61B 5/4035 |
| 2019/0328239 | A1 | 10/2019 | Moon et al. |
| 2020/0100693 | A1* | 4/2020 | Velo ........................ G16H 50/20 |

FOREIGN PATENT DOCUMENTS

| | | |
|---|---|---|
| EP | 2445395 B1 | 1/2017 |
| JP | 2016-501048 A | 1/2016 |
| WO | 2010077997 A2 | 7/2010 |

OTHER PUBLICATIONS

Amin et al., *A New Approach for Detecting Sudden Hypotension in Hemodialysis by Using Dual-Channel Optical System*, Journal of Innovative Optical Health Sciences, vol. 10, No. 1 (2016), 9 pages.

Kim et al., *Cuffless and Non-Invasive Estimation of a Continuous Blood Pressure Based on PTT*, 978-1-4244-7578-8/10 © 2010 IEEE, 4 pages.

Ahlstrom et al., *Noninvasive Investigation of Blood Pressure Changes Using the Pulse Wave Transit Time: A Novel Approach in the Monitoring of Hemodialysis Patients*, J. Artif Ogans (2005), © The Japanese Society for Artificial Organs, 6 pages.

* cited by examiner

SYSTEM FOR DETECTING ABNORMAL BLOOD VOLUME AND PRESSURE

CROSS-REFERENCE TO RELATED APPLICATION

This application claims the benefit of and priority to U.S. patent application Ser. No. 63/177,514 filed Apr. 21, 2021, entitled "SYSTEM FOR DETECTING ABNORMAL BLOOD VOLUME AND PRESSURE," which is incorporated herein by reference in its entirety.

FIELD OF THE DISCLOSURE

This disclosure relates generally to the field of vital signs monitoring devices and, more particularly, to systems and methods for detecting abnormal blood volume (BV) and/or blood pressure (BP).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Figure 1A:
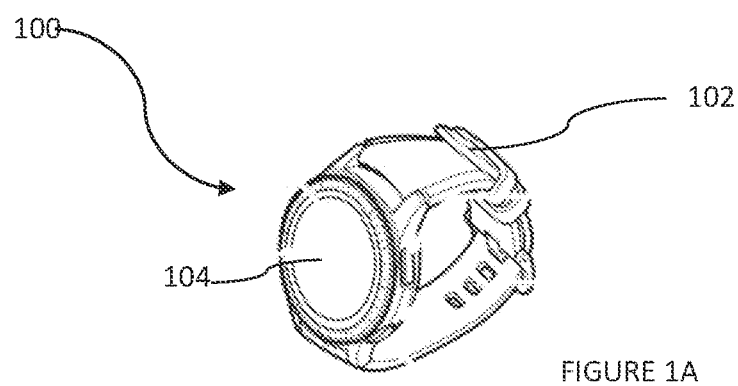
FIGS. 1A and 1B illustrate front and back perspective views, respectively, of a system for detecting abnormal BV and/or BP in a patient in accordance with features of embodiments described herein.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. When used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

During dialysis, a patient's blood pressure (BP) may change (e.g., drop) quickly due to drastic changes in blood volume and/or interstitial fluid volume. Sharp drops in BP can trigger fainting spells or Bezold-Jarisch reflex (BJR) and may be a source of complications or morbidity in patients, especially those with pre-existing coronary artery disease (CAD), congestive heart failure (CHF), and/or chronic hypertension. The pathogenesis of this condition may be neurological or from baroreceptors. In either case, there may be a counteracting sympathetic activation to combat low BP. 15% of patients may experience overreacting sympathetic activation, which may lead to hypertension.

To address this situation, a nurse or other medical professional may check a dialysis patient's BP periodically (e.g., every 15 minutes) during dialysis and may also watch for exhibition of physical symptoms such as sweating, dizziness, nausea, etc., which may serve as indicators of fluid imbalance that is not under control. Using a blood pressure cuff to take a patient's blood pressure during dialysis is undesirable because it cuts off blood flow (albeit in a temporary and limited manner) during a time in which the patient's blood needs to be circulating.

Figure 1B:
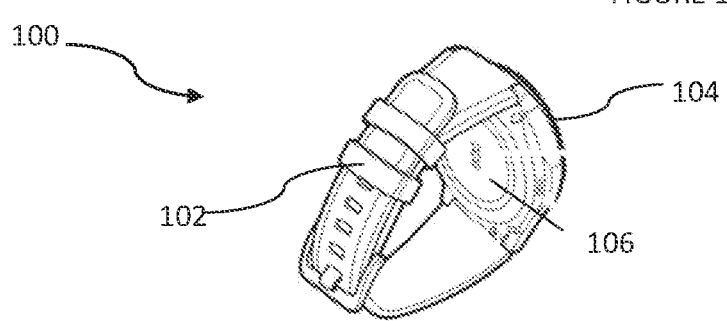

Referring now to FIGS. 1A and 1B, illustrated therein is a wearable device 100 for use in a system implementing embodiments described herein for monitoring for abnormal BV and/or BP in a patient may include a wrist band or a watch 102 worn in contact with the user's skin and including a display 104 and sensors 106. The device 100 may be capable of measuring and monitoring, as well as transmitting and receiving data comprising measurements of a combination of underlying physiological conditions or changes.

Figure 2:
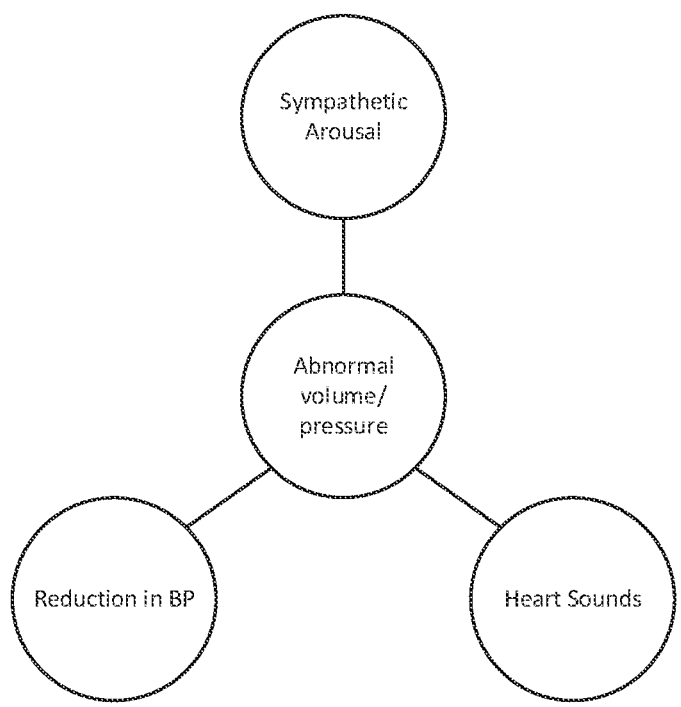
FIG. 2 illustrates example inputs to a system for detecting abnormal BV and/or BP in a patent in accordance with features of embodiments described herein.

For example, referring to FIG. 2, the device 100 (FIGS. 1A and 1B) may be capable of monitoring or detecting a reduction in BP indicated as an increase in pulse transit time (PTT) and sympathetic arousal indicated as a combination of heart rate variability (HRV), electrodermal activity (EDA), pupil opening and/or eye movement, and/or heart sounds, as illustrated in FIG. 2 and as will be described herein. The device shown in FIGS. 1A and 1B may be worn on the wrist of a patient and may include sensors for detecting the heartbeat of the wearer using photoplethysmography (PPG) technology, for example. In alternative configurations, the wearer's heartbeat may be detected using ECG or other appropriate optical and/or electrical technology.

Although the form factor of the wearable device 100 is shown in FIGS. 1A and 1B as a wristband or watch, it will be recognized that other types of wearable devices, including but not limited to one or more adhesive chest patches, a chest strap, and other appropriate devices, may be implemented without departing from the spirit or the scope of embodiments described herein.

In accordance with features of embodiments described herein, a system for detecting abnormal BV and/or BP may be especially useful during dialysis of a patient, when it is inadvisable to cut off the patient's blood flow, even temporarily, using a blood pressure cuff. In general, the system monitors for abnormal blood volume and/or pressure. The system may monitor multiple underlying physiological changes in a monitored patient (e.g., while the patient is undergoing dialysis) such as one or more of: (1) reduction in blood pressure as indicated by an increase in PTT; (2) sympathetic arousal indicated by one or more of a lack of HRV, a spike in EDA, pupil dilation, rapid eye movement and/or other indicators; and (3) heart sounds. It will be recognized that all of the foregoing measurements would be made using appropriate sensors and systems.

It will be recognized that the values and/or ranges of values that correspond to "normal" BV and/or BP will vary based on the physiology of the patent being monitored. For example, a "normal BV/BP for an adult male will be different than that of a female child.

Figure 3:
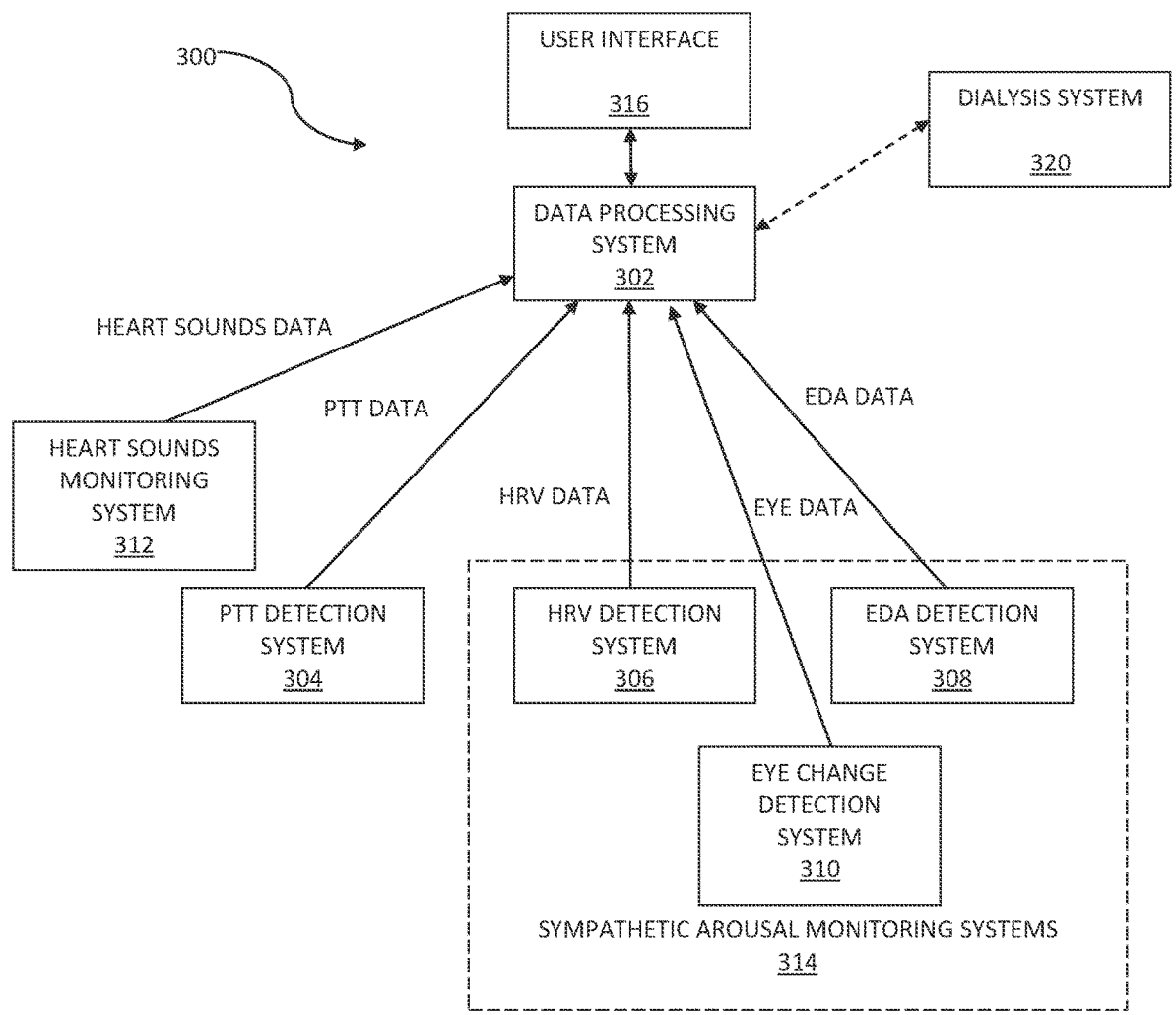
FIG. 3 is a block diagram of a system for detecting abnormal BV and/or BP in a patent in accordance with features of embodiments described herein.

FIG. 3 illustrates a conceptual block diagram of a system 300 for detecting abnormal blood volume and blood pressure, e.g., during dialysis of a patient. As shown in FIG. 3, the system 300 includes a data processing system 302 (e.g., a processor, memory and/or storage devices, and/or input/output devices) for processing patient PTT data received from a PTT detection system 304, patient HRV data from an HRV detection system 306, patient EDA data from an EDA detection system 308, patent eye and pupil movement from an eye movement detection system 310 and (optionally) patient heart sounds data from a heart sounds monitor 312. The systems 304, 306, and 308 collectively comprise sympathetic arousal monitoring systems 314. Information generated by the data processing system may be made accessible to a user (e.g., the patient or a medical professional) in one of any number of useful formats via one or more user interfaces 316.

The EDA detection system 308 may include one or more patches and/or sensors disposed in contact with the patient's skin. Eye movement detection system 310 may include virtual reality (VR) glasses or other glasses that include a camera directed to the wearer's eyes to detect movement thereof, a camera disposed on a computer and directed to the wearer's eyes, or any other optical or electrical systems for detecting eye movement and pupil dilation, for example.

In certain embodiments, information generated by the data processing system 302 may be communicated directly to a dialysis machine 320 for use in controlling operation thereof. Information generated by the data processing system 302 may also be provided to remote systems via a cloud connection.

Figure 4:
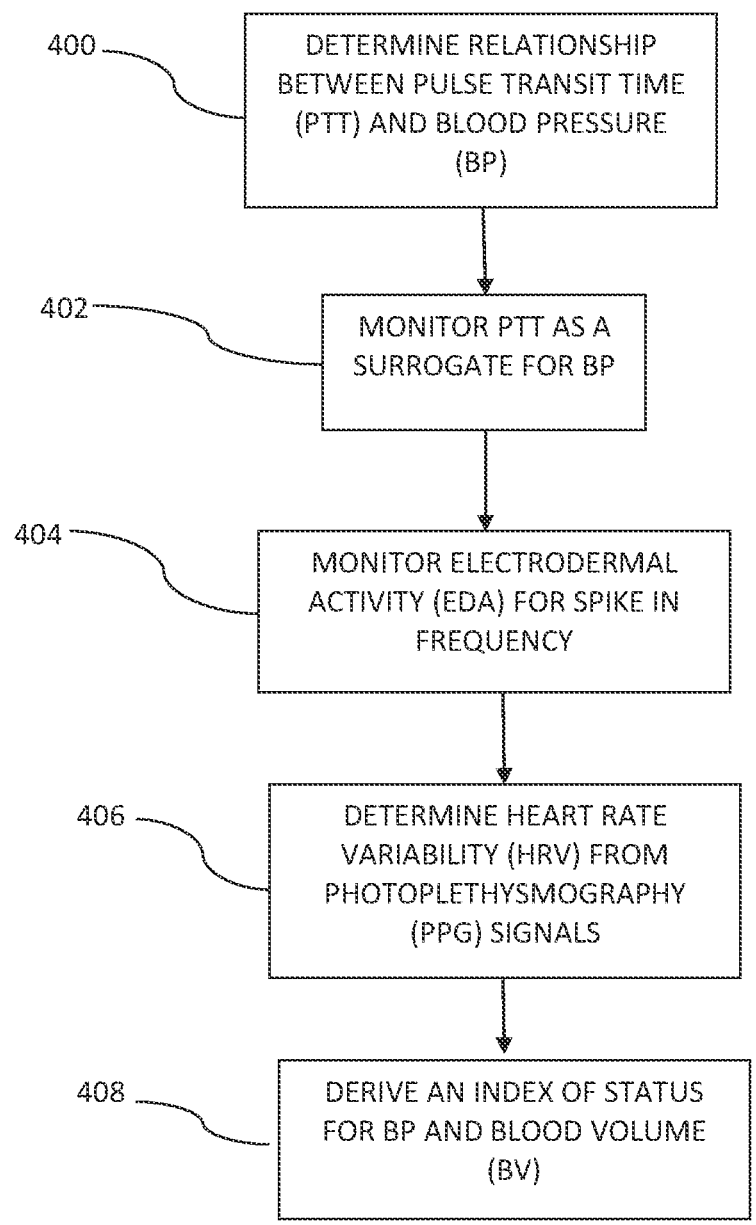
FIG. 4 is a flow diagram illustrating a technique for detecting abnormal BV and/or BP in a patent in accordance with features of embodiments described herein.

A flowchart illustrating operation of the system for detecting abnormal blood volume and pressure during dialysis is shown in FIG. 4. In step 400, a relationship between the patient's BP and pulse transit time (PTT) is determined. In one embodiment, a nurse or other medical professional/technician first measures the patient's BP and PTT, repeats the measurement 15 minutes after the initial measurement, and then uses the two measurements to establish a relationship between PTT and BP for the patient. Thereafter, as represented in step 402, PTT is used as a surrogate for the BP throughout the process (e.g., throughout dialysis). In particular, an increase in PTT correlates to a drop in blood pressure. In accordance with features of embodiments described herein, PTT detection system may include an electrocardiogram (ECG) system in which a number of electrical leads are placed on the patient's skin to measure electrical activity of the heart, as indicated by an ECG signal output from the ECG system, as well as a photoplethysmography (PPG) system (which may include PPG sensors of the device 100 (FIGS. 1A and 1B) and/or fingertip PPG sensors) for producing a PPG signal. PTT is the interval between the peak of the R wave in the ECG signal and any critical point in the PPG signal.

In step 404, EDA signals produced by the EDA detection system are used to look for spike frequency, indicating an increase in EDA corresponding to sympathetic arousal. In step 406, HRV signals are produced by the HRV detection system, which may include part or all of the PPG system discussed above. It will be noted that, for purposes of blood pressure and/or blood volume, a lack of HRV is a negative indicator. Finally, in step 408, an index of status from two or more of the PTT, HRV and/or EDA signals indicative of problematic increase in BP and/or BV is calculated or determined. The medical professional may use this index to determine if and when to halt dialysis and possibly render medical aid to the patient. In accordance with features of embodiments described herein, the index of status in step 408 may be any number or value derived from a combination of weighted or unweighted values associated with one or more of the PTT, HRV, EDA and/or other indicators. The final index of status may be input to a lookup table or may be alternatively used to correlate to a status of the patient with regard to BP and/or BV.

It should be noted that patient eye movement and/or pupil dilation may be used as indicators of sympathetic arousal along with/instead of EDA and/or HRV, as shown in FIG. 4. Eye movement and/or pupil dilation may be monitored and/or detected using any one or more of a variety of optical and/or electrical sensing methods and devices, including but not limited to virtuality reality (VR) glasses worn by the user and designed for such a purpose or a camera, such as a laptop or mobile device camera. Additionally, heart sounds may be considered in deriving the BP/BV status index in the final step.

Figure 5:
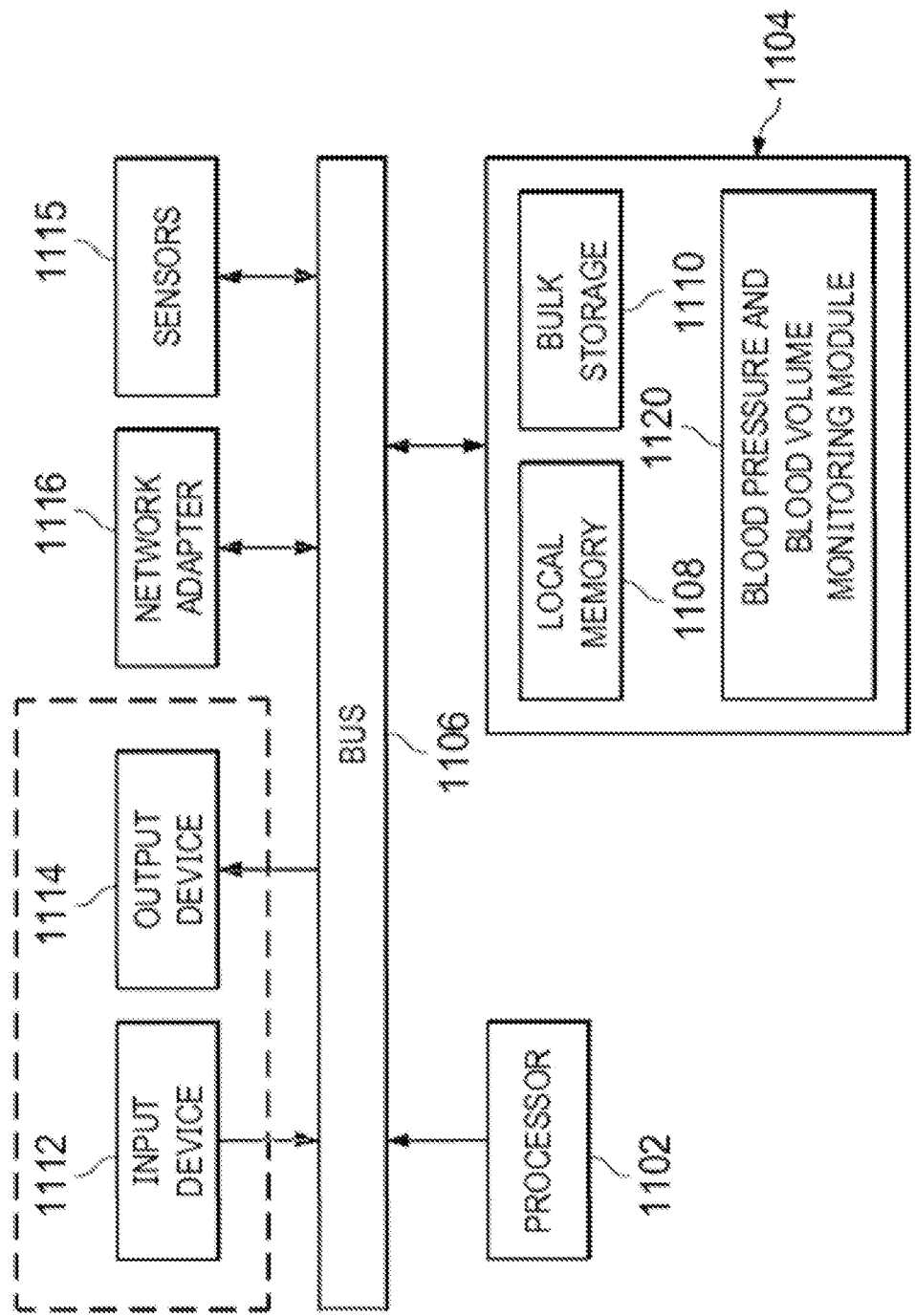
FIG. 5 is a simplified block diagram of a computer system that may be used to implement all or some portion of a system for detecting abnormal BV and/or BP in a patent in accordance with features of embodiments described herein

FIG. 5 is a block diagram illustrating an example system 1100 that may be configured to implement at least portions of techniques for internal battery temperature estimation using impedance measurements in accordance with embodiments described herein, and more particularly as shown in the FIGURES described hereinabove. As shown in FIG. 5, the system 1100 may include at least one processor 1102, e.g., a hardware processor 1102, coupled to memory elements 1104 through a system bus 1106. As such, the system may store program code and/or data within memory elements 1104. Further, the processor 1102 may execute the program code accessed from the memory elements 1104 via a system bus 1106. In one aspect, the system may be implemented as a computer that is suitable for storing and/or executing program code. It should be appreciated, however, that the system 1100 may be implemented in the form of any system including a processor and a memory that is capable of performing the functions described in this disclosure.

In some embodiments, the processor 1102 can execute software or an algorithm to perform the activities as discussed in this specification; in particular, activities related to internal battery temperature estimation using impedance measurements in accordance with embodiments described herein. The processor 1102 may include any combination of hardware, software, or firmware providing programmable logic, including by way of non-limiting example a microprocessor, a DSP, a field-programmable gate array (FPGA), a programmable logic array (PLA), an integrated circuit (IC), an application specific IC (ASIC), or a virtual machine processor. The processor 1102 may be communicatively coupled to the memory element 1104, for example in a direct-memory access (DMA) configuration, so that the processor 1102 may read from or write to the memory elements 1104.

In general, the memory elements 1104 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked, or sent to or from any of the components of the system 1100 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for implementing internal battery temperature estimation using impedance measurements as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g., the memory elements 1104 shown in FIG. 5 can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g., the processor 1102 shown in FIG. 5, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 1104 may include one or more physical memory devices such as, for example, local memory 1108 and one or more bulk storage devices 1110. The local memory may refer to RAM or other non-persistent memory device(s) generally used during actual execution of the program code. A bulk storage device may be implemented as a hard drive or other persistent data storage device. The processing system 1100 may also include one or more cache memories (not shown) that provide temporary storage of at least some program code in order to reduce the number of times program code must be retrieved from the bulk storage device 1110 during execution.

As shown in FIG. 5, the memory elements 1104 may store a BP and BV monitoring module 1120. In various embodiments, the module 1120 may be stored in the local memory 1108, the one or more bulk storage devices 1110, or apart from the local memory and the bulk storage devices. It should be appreciated that the system 1100 may further execute an operating system (not shown in FIG. 5) that can facilitate execution of the module 1120. The module 1120, being implemented in the form of executable program code and/or data, can be read from, written to, and/or executed by the system 1100, e.g., by the processor 1102. Responsive to reading from, writing to, and/or executing the module 1120, the system 1100 may be configured to perform one or more operations or method steps described herein.

Input/output (I/O) devices depicted as an input device 1112 and an output device 1114, optionally, may be coupled to the system. Examples of input devices may include, but are not limited to, a keyboard, a pointing device such as a mouse, or the like. Examples of output devices may include, but are not limited to, a monitor or a display, speakers, or the like. In some implementations, the system may include a device driver (not shown) for the output device 1114. Input and/or output devices 1112, 1114 may be coupled to the system 1100 either directly or through intervening I/O controllers. Additionally, sensors 1115, may be coupled to the system 1100 either directly or through intervening controllers and/or drivers.

In an embodiment, the input and the output devices may be implemented as a combined input/output device (illustrated in FIG. 5 with a dashed line surrounding the input device 1112 and the output device 1114). An example of such a combined device is a touch sensitive display, also sometimes referred to as a "touch screen display" or simply "touch screen." In such an embodiment, input to the device may be provided by a movement of a physical object, such as e.g., a stylus or a finger of a user, on or near the touch screen display.

A network adapter 1116 may also, optionally, be coupled to the system 1100 to enable it to become coupled to other systems, computer systems, remote network devices, and/or remote storage devices through intervening private or public networks. The network adapter may comprise a data receiver for receiving data that is transmitted by said systems, devices and/or networks to the system 1100, and a data transmitter for transmitting data from the system 1100 to said systems, devices and/or networks. Modems, cable modems, and Ethernet cards are examples of different types of network adapter that may be used with the system 1100.

Example 1 provides a system for detecting at least one of abnormal blood pressure and abnormal blood volume in a user, the system comprising a wearable device disposed in contact with skin of the user; a processing system; a pulse transit time (PTT) detection system for providing a PTT signal indicative of a PTT of the user to the processing system, wherein PTT of the user is used as a surrogate for a blood pressure (BP) of the user; and a sympathetic arousal detection system for providing at least one signal indicative of a sympathetic arousal condition of the user to the processing system; wherein the processing system processes the PTT signal and the at least one sympathetic arousal signal to determine an index indicative of at least one of abnormal blood pressure and abnormal blood volume of the user.

Example 2 provides the system of example 1, wherein the sympathetic arousal detection system comprises an electrodermal activity (EDA) detection system and wherein the at least one sympathetic arousal signal comprises an EDA signal indicative of an EDA of the user.

Example 3 provides the system of any of examples 1-2, wherein the sympathetic arousal detection system comprises a heart rate variability (HRV) detection system and wherein the at least one sympathetic arousal signal comprises a signal indicative of an HRV of the user.

Example 4 provides the system of any of examples 1-3, wherein the sympathetic arousal detection system comprises an eye change detection system and wherein the at least one sympathetic arousal signal comprises a signal indicative of an eye change of the user.

Example 5 provides the system of example 4, wherein the eye change of the user comprises at least one of pupil dilation and eye movement.

Example 6 provides the system of example 4, wherein the eye change detection system comprises a camera.

Example 7 provides the system of any of examples 1-6, further comprising a heart sounds monitor for providing a signal indicative of heart sounds of the user to the processing system, wherein the processing system processes the PTT signal, the at least one sympathetic arousal signal, and the heart sounds signal to determine an index indicative of an abnormal blood pressure or blood volume of the user.

Example 8 provides the system of any of examples 1-7, wherein the wearable device comprises photoplethysmography (PPG) sensors for producing a PPG signal.

Example 9 provides the system of example 8, wherein the wearable device comprises a watch.

Example 10 provides the system of any of examples 1-9, wherein the system further comprises an electrocardiogram (ECG) system for producing an ECG signal.

Example 11 provides the system of any of examples 1-10, wherein the wearable device comprises a chest patch.

Example 12 provides a method for detecting abnormal blood pressure or blood volume in a user, the method comprising attaching a wearable device in contact with skin of the user; generating a PTT signal indicative of a PTT of the user, wherein PTT of the user is used as a surrogate for a blood pressure (BP) of the user; generating at least one signal indicative of a sympathetic arousal condition of the user to the processing system; and processing the PTT signal and the at least one sympathetic arousal signal to determine an index indicative of an abnormal blood pressure or blood volume of the user.

Example 13 provides the method of example 12, wherein the at least one sympathetic arousal signal comprises an EDA signal indicative of an EDA of the user.

Example 14 provides the method of any of examples 12-13, wherein the at least one sympathetic arousal signal comprises a signal indicative of an HRV of the user.

Example 15 provides the method of any of examples 12-14, wherein the at least one sympathetic arousal signal comprises a signal indicative of an eye change of the user.

Example 16 provides the method of example 15, wherein the eye change of the user comprises at least one of pupil dilation and eye movement.

Example 17 provides the method of any of examples 12-16, further comprising generating a signal indicative of heart sounds of the user; and processing the PTT signal, the at least one sympathetic arousal signal, and the heart sounds signal to determine an index indicative of an abnormal blood pressure or blood volume of the user Example 18 provides the method of any of examples 12-17, further comprising generating a photoplethysmography (PPG) signal for the user, the PPG signal for use in generating the PTT signal and the HRV signal.

Example 19 provides the method of any of examples 12-18, further comprising generating an electrocardiogram (ECG) signal for the user, the ECG signal for use in generating the PTT signal.

Example 20 provides the method of any of examples 12-19, wherein the wearable device is attached to a wrist of the user.

Example 21 provides the method of any of examples 12-20, wherein the wearable device is attached to a chest of the user.

Example 22 provides a system for detecting at least one of abnormal blood pressure and abnormal blood volume in a user, the system comprising a processor; a pulse transit time (PTT) detection system for providing a PTT signal indicative of a PTT of the user to the processor; and a sympathetic arousal detection system for providing at least one signal indicative of a sympathetic arousal condition of the user to the processor; wherein the processor processes the PTT signal and the at least one sympathetic arousal signal to detect a condition of the user.

Example 23 provides the system of example 22, wherein the detected condition comprises at least one of an abnormal blood pressure and an abnormal blood volume of the user.

Example 24 provides the system of any of examples 22-23, wherein the sympathetic arousal detection system comprises an electrodermal activity (EDA) detection system and wherein the at least one sympathetic arousal signal comprises an EDA signal indicative of an EDA of the user.

Example 25 provides the system of any of examples 22-24, wherein the sympathetic arousal detection system comprises a heart rate variability (HRV) detection system and wherein the at least one sympathetic arousal signal comprises a signal indicative of an HRV of the user.

Example 26 provides the system of any of examples 22-25, wherein the sympathetic arousal detection system comprises an eye change detection system and wherein the at least one sympathetic arousal signal comprises a signal indicative of an eye change of the user.

Example 27 provides the system of examples 26, wherein the eye change of the user comprises at least one of pupil dilation and eye movement.

Example 28 provides the system of example 26, wherein the eye change detection system comprises a camera.

Example 29 provides the system of any of examples 22-28, further comprising a heart sounds monitor for providing a signal indicative of heart sounds of the user to the processing system, wherein the processing system processes the PTT signal, the at least one sympathetic arousal signal, and the heart sounds signal to determine an index indicative of an abnormal blood pressure or blood volume of the user.

Example 30 provides the system of any of examples 22-29, wherein the wearable device comprises photoplethysmography (PPG) sensors for producing a PPG signal.

Example 31 provides the system of any of examples 22-30, wherein the system further comprises an electrocardiogram (ECG) system for producing an ECG signal.

It should be noted that all of the specifications, dimensions, and relationships outlined herein (e.g., the number of elements, operations, steps, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, exemplary embodiments have been described with reference to particular component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system may be consolidated in any suitable manner. Along similar design alternatives, any of the illustrated components, modules, and elements of the figures may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the figures and itsteachings are readily scalable and may accommodate a large number of components, as well as more complicated/sophisticated arrangements and configurations. Accordingly, the examples provided should not limit the scope or inhibit the broad teachings of the electrical circuits as potentially applied to myriad other architectures.

It should also be noted that in this Specification, references to various features (e.g., elements, structures, modules, components, steps, operations, characteristics, etc.) included in "one embodiment", "exemplary embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It should also be noted that the functions related to circuit architectures illustrate only some of the possible circuit architecture functions that may be executed by, or within, systems illustrated in the figures. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Note that all optional features of the device and system described above may also be implemented with respect to the method or process described herein and specifics in the examples may be used anywhere in one or more embodiments.

The "means for" in these instances (above) may include (but is not limited to) using any suitable component discussed herein, along with any suitable software, circuitry, hub, computer code, logic, algorithms, hardware, controller, interface, link, bus, communication pathway, etc.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying figures (and their teachings) are readily scalable and may accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the figures. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the figures in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A system for detecting at least one of abnormal blood pressure or abnormal blood volume in a user, the system comprising:
   a wearable device disposed in contact with skin of the user;
   a processing system;
   a pulse transit time (PTT) detection system for providing a PTT signal indicative of a PTT of the user to the processing system during dialysis of the user, wherein PTT of the user is used as a surrogate for a blood pressure (BP) of the user; and
   a sympathetic arousal detection system for providing at least one signal indicative of a sympathetic arousal condition of the user to the processing system during dialysis of the user;
   wherein the processing system processes the PTT signal and the at least one sympathetic arousal signal to determine an index indicative of at least one of abnormal blood pressure or abnormal blood volume of the user during dialysis of the user.

2. The system of claim 1, wherein the sympathetic arousal detection system comprises an electrodermal activity (EDA) detection system and wherein the at least one sympathetic arousal signal comprises an EDA signal indicative of an EDA of the user.

3. The system of claim 1, wherein the sympathetic arousal detection system comprises a heart rate variability (HRV) detection system and wherein the at least one sympathetic arousal signal comprises a signal indicative of an HRV of the user.

4. The system of claim 1, wherein the sympathetic arousal detection system comprises an eye change detection system and wherein the at least one sympathetic arousal signal comprises a signal indicative of an eye change of the user.

5. The system of claim 4, wherein the eye change of the user comprises at least one of pupil dilation or eye movement.

6. The system of claim 4, wherein the eye change detection system comprises a camera.

7. The system of claim 1, further comprising a heart sounds monitor for providing a signal indicative of heart sounds of the user to the processing system during dialysis of the user, wherein the processing system processes the PTT signal, the at least one sympathetic arousal signal, and the signal indicative of heart sounds to determine an index indicative of an abnormal blood pressure or blood volume of the user during dialysis of the user.

8. The system of claim 1, wherein the wearable device comprises photoplethysmography (PPG) sensors for producing a PPG signal.

9. The system of claim 8, wherein the wearable device comprises a watch.

10. The system of claim 1, wherein the system further comprises an electrocardiogram (ECG) system for producing an ECG signal.

11. The system of claim 1, wherein the wearable device comprises a chest patch.

12. The system of claim 1, wherein the processing system communicates the index to a dialysis machine for use in controlling operation of the dialysis machine.

13. A method for detecting abnormal blood pressure or blood volume in a user, the method comprising:
    attaching a wearable device in contact with skin of the user;
    generating a pulse transit time (PTT) signal indicative of a PTT of the user during dialysis of the user, wherein the PTT of the user is used as a surrogate for a blood pressure (BP) of the user;
    generating at least one signal indicative of a sympathetic arousal condition of the user during dialysis; and
    processing the PTT signal and the at least one sympathetic arousal signal to determine an index indicative of an abnormal blood pressure or blood volume of the user during dialysis of the user.

14. The method of claim 13, wherein the at least one signal indicative of the sympathetic arousal condition comprises at least one of an electrodermal activity (EDA) signal indicative of an EDA of the user, a signal indicative of a heart rate variability (HRV) of the user; or a signal indicative of an eye change of the user.

15. The method of claim 14, wherein the eye change of the user comprises at least one of pupil dilation or eye movement.

16. The method of claim 14, further comprising generating a photoplethysmography (PPG) signal for the user, the PPG signal for use in generating the PTT signal and the signal indicative of the HRV of the user.

17. The method of claim 13, further comprising:
    generating a signal indicative of heart sounds of the user during dialysis of the user; and
    processing the PTT signal, the at least one signal indicative of the sympathetic arousal condition, and the signal indicative of the heart sounds to determine an index indicative of an abnormal blood pressure or blood volume of the user during dialysis of the user.

18. The method of claim 13, further comprising generating an electrocardiogram (ECG) signal for the user, the ECG signal for use in generating the PTT signal.

19. A system for detecting at least one of abnormal blood pressure or abnormal blood volume in a user, the system comprising:

a processor;

a pulse transit time (PTT) detection system for providing a PTT signal indicative of a PTT of the user to the processor during dialysis of the user; and a sympathetic arousal detection system for providing at least one signal indicative of a sympathetic arousal condition of the user to the processor during dialysis of the user;

wherein the processor processes the PTT signal and the at least one sympathetic arousal signal to detect a condition of the user during dialysis of the user.

20. The system of claim 19, wherein the detected condition comprises at least one of an abnormal blood pressure or an abnormal blood volume of the user.

21. The system of claim 19, wherein the sympathetic arousal detection system comprises at least one of an electrodermal activity (EDA) detection system for producing an EDA signal indicative of an EDA of the user, a heart rate variability (HRV) detection system for producing a signal indicative of an HRV of the user, and an eye change detection system for producing a signal indicative of an eye change of the user, wherein the eye change of the user comprises at least one of pupil dilation and eye movement.

* * * * *